United States Patent
Vosburgh

(10) Patent No.: US 9,866,267 B2
(45) Date of Patent: Jan. 9, 2018

(54) DEVICES AND METHODS FOR DIVERSITY SIGNAL ENHANCEMENT AND COSITE CANCELLATION

(71) Applicant: Physical Devices, LLC, Durham, NC (US)

(72) Inventor: Frederick Vosburgh, Durham, NC (US)

(73) Assignee: PHYSICAL DEVICES, LLC, Durham, NC (US)

( * ) Notice: Subject to any disclaimer, the term of this patent is extended or adjusted under 35 U.S.C. 154(b) by 0 days.

(21) Appl. No.: 15/216,809

(22) Filed: Jul. 22, 2016

(65) Prior Publication Data
US 2016/0329926 A1  Nov. 10, 2016

Related U.S. Application Data

(63) Continuation of application No. 14/629,326, filed on Feb. 23, 2015, now abandoned.
(Continued)

(51) Int. Cl.
*H04B 1/525* (2015.01)
*H04B 7/04* (2017.01)
(Continued)

(52) U.S. Cl.
CPC ............. *H04B 1/525* (2013.01); *H04B 7/04* (2013.01); *H04B 7/0894* (2013.01); *H04B 15/00* (2013.01);
(Continued)

(58) Field of Classification Search
CPC ........ H04B 1/525; H04B 7/04; H04B 7/0894; H04B 15/00; H04B 15/04; H04L 27/01; H04L 27/18
See application file for complete search history.

(56) References Cited

U.S. PATENT DOCUMENTS 3,946,337 A * 3/1976 Philips ............... H03C 3/22
332/105
4,085,368 A 4/1978 Yeh
(Continued)

FOREIGN PATENT DOCUMENTS

EP         1 727 277 A1   11/2006
WO    WO 2012/030658 A2    3/2012
(Continued)

OTHER PUBLICATIONS

Non-Final Office Action for U.S. Appl. No. 15/149,030 (dated Sep. 29, 2016).
(Continued)

*Primary Examiner* — Sophia Vlahos
(74) *Attorney, Agent, or Firm* — Jenkins, Wilson, Taylor & Hunt, P.A.

(57) ABSTRACT

Devices and methods for providing enhanced diversity reception and cosite cancellation are disclosed. According to one aspect, the subject matter described herein includes a device for providing enhanced diversity reception and cosite cancellation. The device includes a transmit chain connected to a circulator further connected to first antenna and to a combiner. The combiner is connected to anti-cosite circuitry and to first detector. The anti-cosite circuitry is further connected to a secondary antenna. The first detector is further connected to a receive chain.

22 Claims, 10 Drawing Sheets

Related U.S. Application Data

(60) Provisional application No. 61/968,128, filed on Mar. 20, 2014, provisional application No. 61/943,171, filed on Feb. 21, 2014.

(51) Int. Cl.
  *H04L 27/18* (2006.01)
  *H04L 27/01* (2006.01)
  *H04B 15/00* (2006.01)
  *H04B 7/08* (2006.01)
  *H04B 15/04* (2006.01)

(52) U.S. Cl.
  CPC ............. *H04B 15/04* (2013.01); *H04L 27/01* (2013.01); *H04L 27/18* (2013.01)

(56) References Cited

U.S. PATENT DOCUMENTS

| | | | |
|---|---|---|---|
| 4,313,116 A | 1/1982 | Powell et al. | |
| 5,179,727 A | 1/1993 | Imagawa | |
| 5,285,479 A | 2/1994 | Iwane | |
| 5,386,198 A | 1/1995 | Ripstrand et al. | |
| 5,412,735 A | 5/1995 | Engebretson et al. | |
| 5,442,582 A | 8/1995 | Lange et al. | |
| 5,712,641 A | 1/1998 | Casabona et al. | |
| 5,736,909 A | 4/1998 | Hauser et al. | |
| 5,783,977 A | 7/1998 | Chethik | |
| 5,872,540 A | 2/1999 | Casabona et al. | |
| 6,154,641 A | 11/2000 | Zhang | |
| 6,172,970 B1* | 1/2001 | Ling | H04B 7/0814 370/347 |
| 6,175,327 B1 | 1/2001 | Lin et al. | |
| 6,201,955 B1* | 3/2001 | Jasper | H04B 7/0857 455/276.1 |
| 6,236,315 B1 | 5/2001 | Helms et al. | |
| 6,314,127 B1* | 11/2001 | Lynch | H04B 1/7115 375/144 |
| 6,323,806 B1 | 11/2001 | Greving | |
| 6,359,503 B1 | 3/2002 | Alini et al. | |
| 6,363,263 B1 | 3/2002 | Reudink et al. | |
| 6,385,435 B1 | 5/2002 | Lee | |
| 6,486,828 B1 | 11/2002 | Cahn et al. | |
| 6,590,528 B1 | 7/2003 | DeWulf | |
| 6,639,541 B1 | 10/2003 | Quintana et al. | |
| 6,710,739 B1 | 3/2004 | Loegering | |
| 6,847,803 B1* | 1/2005 | Rauhala | H04B 1/126 370/252 |
| 6,961,577 B2 | 11/2005 | Nagato et al. | |
| 7,139,592 B2 | 11/2006 | Leifer et al. | |
| 7,904,047 B2 | 3/2011 | Darabi | |
| 8,032,103 B2 | 10/2011 | Lackey | |
| 8,064,837 B2 | 11/2011 | Sampath | |
| 8,078,100 B2 | 12/2011 | Proctor, Jr. et al. | |
| 8,086,206 B1 | 12/2011 | Lackey | |
| 8,090,338 B1 | 1/2012 | Lackey | |
| 8,090,339 B1 | 1/2012 | Lackey | |
| 8,351,889 B2 | 1/2013 | Roussel et al. | |
| 8,355,676 B2 | 1/2013 | Franklin | |
| 8,380,771 B2 | 2/2013 | Hahn et al. | |
| 8,666,347 B2 | 3/2014 | Wilkerson et al. | |
| 8,682,275 B2 | 3/2014 | Kerth et al. | |
| 8,965,319 B2 | 2/2015 | Wilkerson et al. | |
| 9,042,857 B2 | 5/2015 | Vosburgh et al. | |
| 9,203,461 B2 | 12/2015 | Vosburgh et al. | |
| 9,219,508 B1* | 12/2015 | Veysoglu | H04B 1/10 |
| 9,325,433 B2* | 4/2016 | Ismail | H04B 1/525 |
| 9,350,401 B2 | 5/2016 | Wilkerson | |
| 9,450,625 B2 | 9/2016 | Vosburgh et al. | |
| 9,519,062 B2 | 12/2016 | Vosburgh et al. | |
| 2002/0122406 A1* | 9/2002 | Chillariga | H04B 1/7143 370/347 |
| 2002/0125947 A1 | 9/2002 | Ren | |
| 2003/0130751 A1 | 7/2003 | Lim | |
| 2004/0185815 A1* | 9/2004 | Fukuda | H04B 1/126 455/296 |
| 2006/0262880 A1 | 11/2006 | Mizuta et al. | |
| 2007/0066226 A1* | 3/2007 | Cleveland | H04B 1/00 455/63.1 |
| 2008/0136473 A1 | 6/2008 | Bollenbeck et al. | |
| 2008/0211715 A1 | 9/2008 | Feintuch et al. | |
| 2010/0022197 A1* | 1/2010 | Kato | H04B 1/3805 455/75 |
| 2010/0048156 A1 | 2/2010 | Hahn | |
| 2010/0136925 A1 | 6/2010 | Lackey | |
| 2010/0136941 A1 | 6/2010 | Lackey | |
| 2010/0178874 A1 | 7/2010 | Chiou et al. | |
| 2010/0244943 A1 | 9/2010 | Hahn et al. | |
| 2011/0019722 A1 | 1/2011 | Amirkhany | |
| 2011/0227665 A1 | 9/2011 | Wyville | |
| 2011/0300813 A1 | 12/2011 | Mirzaei et al. | |
| 2012/0025929 A1 | 2/2012 | Muterspaugh et al. | |
| 2012/0201153 A1 | 8/2012 | Bharadia et al. | |
| 2012/0201173 A1 | 8/2012 | Jain et al. | |
| 2012/0252392 A1 | 10/2012 | Wilkerson et al. | |
| 2013/0155911 A1* | 6/2013 | Kahrizi | H04B 1/525 370/277 |
| 2013/0225099 A1 | 8/2013 | Vosburgh et al. | |
| 2014/0073266 A9 | 3/2014 | Vosburgh et al. | |
| 2014/0152499 A1 | 6/2014 | Vosburgh et al. | |
| 2014/0185723 A1* | 7/2014 | Belitzer | H03L 7/08 375/354 |
| 2014/0199956 A1 | 7/2014 | Wilkerson | |
| 2014/0235190 A1 | 8/2014 | Wilkerson et al. | |
| 2015/0244431 A1 | 8/2015 | Vosburgh | |
| 2015/0288413 A1 | 10/2015 | Vosburgh et al. | |
| 2016/0087659 A1 | 3/2016 | Vosburgh et al. | |
| 2016/0329879 A1 | 11/2016 | Wilkerson | |
| 2016/0380745 A1* | 12/2016 | Wu | H04B 1/525 370/277 |

FOREIGN PATENT DOCUMENTS

| | | |
|---|---|---|
| WO | WO 2013/056270 A1 | 9/2013 |
| WO | WO 2013/130818 A1 | 9/2013 |
| WO | WO 2014/113613 A1 | 7/2014 |

OTHER PUBLICATIONS

Extended European Search Report for European Application No. 14740838.9 (dated Sep. 23, 2016).
Notice of Allowance and Fee(s) Due for U.S. Appl. No. 13/781,226 (dated Aug. 3, 2016).
Applicant-Initiated Interview Summary for U.S. Appl. No. 13/781,226 (dated Jun. 14, 2016).
Notice of Allowance and Fee(s) Due for U.S. Appl. No. 14/927,374 (dated May 23, 2016).
Commonly-assigned, co-pending, U.S. Appl. No. 15/149,030 for "Tunable Filter Devices and Methods," (Unpublished, filed May 6, 2016).
Final Office Action for U.S. Appl. No. 13/781,226 (dated Feb. 12, 2016).
Non-Final Office Action for U.S. Appl. No. 14/927,374 (dated Jan. 25, 2016).
Notice of Allowance and Fee(s) Due for U.S. Appl. No. 13/820,064 (dated Jan. 22, 2016).
Non-Final Office Action for U.S. Appl. No. 14/629,326 (dated Jan. 22, 2016).
Communication of European publication number and information on the application of Article 67(3) EPC for European Application No. 14740838.9 (dated Oct. 28, 2015).
Extended European Search Report for European Patent Application No. 13754265.0 (dated Oct. 14, 2015).
Extended European Search Report for European Patent Application No. 12839313.9 (dated Sep. 24, 2015).
Restriction and/or Election Requirement for U.S. Appl. No. 14/629,326 (dated Sep. 23, 2015).
Final Office Action for U.S. Appl. No. 13/820,064 (dated Sep. 9, 2015).

(56) References Cited

OTHER PUBLICATIONS

Notice of Allowance and Fee(s) Due for U.S. Appl. No. 14/719,302 (dated Jul. 31, 2015).
Non-Final Office Action for U.S. Appl. No. 13/781,226 (dated Jul. 6, 2015).
Communication pursuant to Rule 164(1) EPC for European Patent Application No. 12839313.9 (dated Jun. 2, 2015).
Commonly-assigned, co-pending U.S. Appl. No. 14/629,326 for "Devices and Methods for Diversity Signal Enhancement and Cosite Cancellation," (Unpublished, filed Feb. 23, 2015).
Non-Final Office Action for U.S. Appl. No. 13/820,064 (dated Feb. 18, 2015).
Notice of Allowance and Fee(s) Due for U.S. Appl. No. 13/745,729 (dated Jan. 22, 2015).
Communication of European Publication number and Information on the Application of Article 67(3) EPC for European Patent Application No. 13754265.0 (dated Dec. 10, 2014).
Restriction/Election Requirement for U.S. Appl. No. 13/745,729 (dated Nov. 12, 2014).
First Office Action for Chinese Patent Application No. 201180051482.8 (dated Oct. 29, 2014).
Notice of Allowance and Fee(s) Due for U.S. Appl. No. 14/194,924 (dated Oct. 17, 2014).
Communication of European Publication number and Information on the Application of Article 67(3) EPC for European Patent Application No. 12839313.9 (dated Jul. 23, 2014).
Non-Final Office Action for U.S. Appl. No. 14/194,924 (dated Jun. 13, 2014).
Notification of Transmittal of the International Search Report and the Written Opinion of the International Searching Authority, or the Declaration for PCT International Patent Application No. PCT/US2014/011941 (dated Apr. 29, 2014).
Extended European Search Report for European Application No. 11822404.7 (dated Jan. 17, 2014).
Notice of Allowance and Fee(s) Due for U.S. Appl. No. 13/271,420 (dated Oct. 15, 2013).
Bharadia et al., "Full Duplex Radios," pp. 1-12 (Aug. 12, 2013).
Notification of Transmittal of the International Search Report and the Written Opinion of the International Searching Authority, or the Declaration for PCT International Patent Application No. PCT/US2013/028338 (dated Jul. 25, 2013).
Notice of Allowance and Fee(s) Due for U.S. Appl. No. 13/271,420 (dated Jun. 25, 2013).
Communication of European Publication Number and Information on the Application of Article 67(3) EPC for European Patent Application No. 11822404.7 (dated Jun. 12, 2013).
Notification of Transmittal of the International Search Report and the Written Opinion of the International Searching Authority, or the Declaration for PCT International Patent Application No. PCT/US2012/066259 (dated Mar. 28, 2013).
Non-Final Action for U.S. Appl. No. 13/271,420 (dated Feb. 6, 2013).
International Search Report for International Patent Application No. PCT/US2011/049399 (dated Mar. 2, 2012).
Jain et al., "Practical, Real-time, Full Duplex Wireless," pp. 1-12 (Sep. 19, 2011).
U.S. Appl. No. 61/485,980 for "Adaptive Techniques for Full-Duplex Wireless," (May 13, 2011).
U.S. Appl. No. 61/462,493 for "Single Channel Full-Duplex Wireless Communication," (Feb. 3, 2011).
Choi et al., "Achieving Single Channel, Full Duplex Wireless Communication," pp. 1-12 (Sep. 20, 2010).
Widrow et al., "Adaptive Inverse Control," Proceedings of the 1993 International Symposium on Intelligent Control, pp. 1-6 (Aug. 1993).
Notice of Allowance and Fee(s) Due for U.S. Appl. No. 15/149,030 (dated Apr. 12, 2017).

* cited by examiner

DEVICES AND METHODS FOR DIVERSITY SIGNAL ENHANCEMENT AND COSITE CANCELLATION

PRIORITY CLAIM

This application is a continuation of U.S. patent application Ser. No. 14/629,326, filed Feb. 23, 2015, which claims the benefit of U.S. Provisional Patent Application Ser. No. 61/943,171, filed Feb. 21, 2014 and U.S. Provisional Patent Application Ser. No. 61/968,128, filed Mar. 20, 2014; the disclosures of which are incorporated herein by reference in their entireties.

TECHNICAL FIELD

The subject matter described herein relates to receiving wireless signals. More specifically, it relates to improved isolating of inbound signals.

BACKGROUND

Today, when a cell phone suffers fading with its primary antenna, it switches to a diversity antenna to avoid the spatial null causing weak reception by the primary antenna. This diversity antenna is connected to the receiver via a costly micro-coaxial cable, for which the industry is seeking an alternative solution that improves reception.

To reduce size and cost, cell phones use the primary antenna to both transmit and receive signals, although this exposes the receive chain to incursion by powerful transmit signals, causing cosite interference that disrupts reception. Anti-cosite devices used to prevent this, e.g. duplexed pairs of off-chip filters, switches and circulators, currently provide insufficient protection, clearly creating a need for an alternative solution. Accordingly, in light of the above, there exists a need for devices and methods for providing enhanced diversity reception and cosite cancellation.

The demand by cell phone users for higher data transfer rate ("speed") is driving the evolution of wireless standards to include aggregation of multiple carriers at different frequencies, making rejection of self-interference ("blockers") more challenging that can slow or disrupt data transfer. Added to this are the fixed frequency carrier selection filters used today, which comprise off-chip components that are driving the cost and size of cell phone front ends. Replacing off-chip filter banks with active circuits can save cost and space but would create noise and risk distortion caused by insufficient blocker mitigation, making existing active filters an unacceptable alternative to today's filter banks.

In light of this, we disclose active integrated circuits and methods for wideband tunable carrier aggregation ("CA") filtering wherein channel selection filtering rejects out-of-band frequencies to mitigate blockers and other sources of OOB interference, and circuit noise within the channel or channels to enable enhanced carrier aggregated reception of wireless signals.

SUMMARY

According to one aspect, the subject matter described herein includes a device for providing enhanced diversity reception and cosite cancellation. The device includes a transmit chain connected to a circulator further connected to first antenna and to a combiner, said combiner being connected to adjusting circuitry and to first detector, said adjusting circuitry being further connected to a secondary antenna, said first detector being further connected to receive chain.

According to another aspect, the subject matter described herein includes a method for providing enhanced diversity reception and cosite cancellation. The method includes transmitting signals with a first antenna, receiving signals from the first antenna, conducting the received signals to a combiner, detecting a diversity signal with a secondary antenna, adjusting the diversity signal to provide an adjusted diversity signal, providing the adjusted diversity signal to the combiner, and combining the adjusted diversity signal and received signal to provide enhanced receiving of inbound signal.

The subject matter described herein includes circuits and methods providing tunable isolation of carrier signals, where a carrier signal can be a single frequency signal or a multi-frequency (including CDMA, GSM, multiple aggregated single frequencies and spread spectrum) signal, from self-interference from the transmit signal chain entering the receive signal chain. One embodiment of the device comprises a blocker reduction stage connected to a carrier selection stage, which provide in sequence wideband cancellation of blockers and wideband tunable isolation of a plurality of carrier signals and reduction of circuit noise in isolated carrier signals. Again, each carrier signal that is selected or isolated may include a single frequency or plural frequencies.

The subject matter described herein can be implemented using software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. Devices embodying the subject matter described herein may be manufactured by any means, such as by semiconductor fabrication or discrete component assembly although other types of manufacturer are also acceptable, and can be manufactured of any material, e.g., CMOS or Gallium Nitride.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1A:
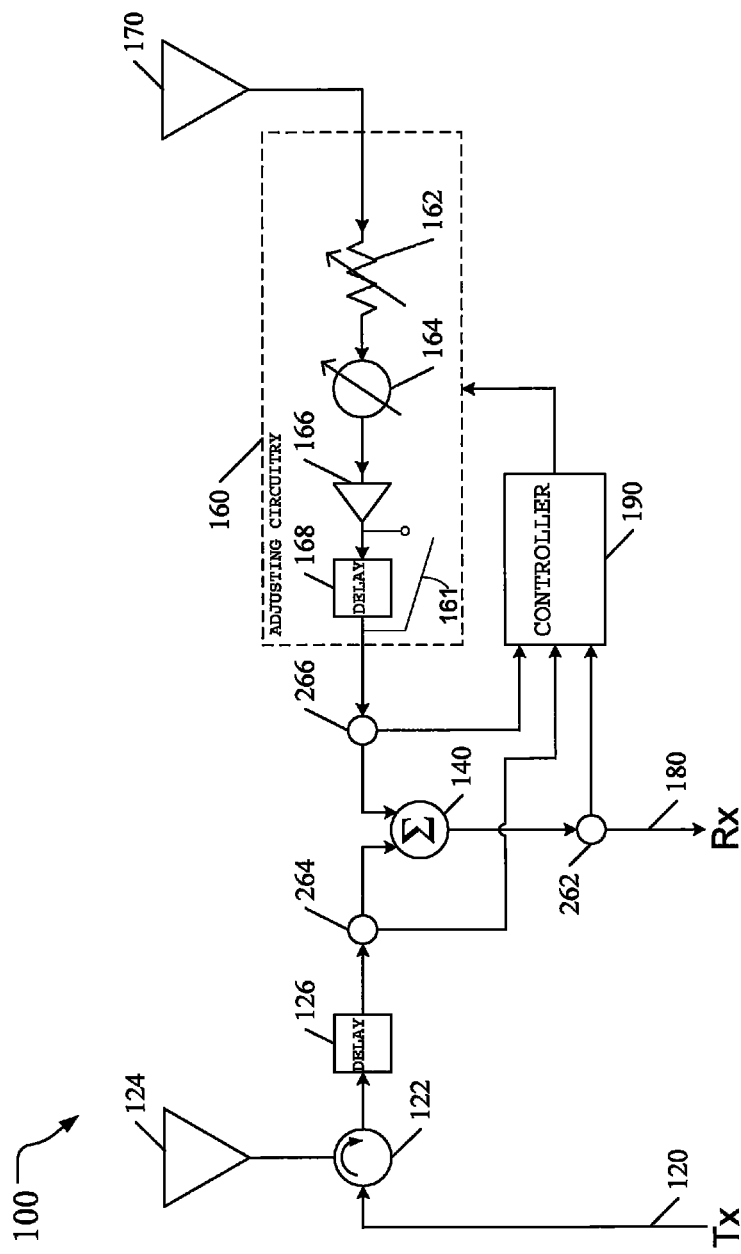
FIG. 1a is a block diagram illustrating an exemplary system for providing enhanced diversity reception and cosite cancellation according to an embodiment of the subject matter described herein.

In accordance with the subject matter disclosed herein, devices and methods for diversity signal enhancement and cosite cancellation are provided. In one embodiment, a cell phone providing enhanced diversity reception and cosite cancellation is presented.

The following is described in terms of cell phones but is intended to encompass methods and devices for receiving any type of wireless signal. A signal desirably received from another device is defined here as an inbound signal.

As used herein, the term "cosite interference" (or simply, "cosite") is used as commonly defined, e.g., the existence of self-interference in a received signal created by transmitted signal content entering the received signal path either by over-the-air transmission or by in-device conduction.

As used herein, the term "T/R antenna" is used to describe an antenna used to both transmit and receive wireless signals.

As used herein, the term "diversity antenna" (or simply, "diversity") is used as commonly defined, e.g., a system of one or more set apart second antenna used to provide a signal for enhanced reception, such as a secondary antenna providing a secondary signal to a wireless receiver.

As used herein, the term "group delay" refers to a measure of the time delay of the amplitude envelopes of the various sinusoidal components of a signal through one or more circuit components. Group delay is a constant time that has an effect on phase that increases with frequency.

As used herein, the term "phase delay" refers to a time period equal to a portion of the wave period at a given frequency.

As used herein, the term "relative delay" is defined as the difference in group delay between signals that are combined.

As used herein, the term "diversity signal" is defined as any signal received by at least one diversity ("secondary") antenna and, for the purposes of the current disclosure, may include transmit signal ("cosite") content of any type or may be affected by fading of any type and/or by losses during conduction from diversity antenna to receive chain.

As used herein, the term "tuning" is defined as controllable change of at least one of: center frequency, bandwidth, amplitude, phase and delay.

As used herein, the term "transmit chain" is defined as circuit elements providing transmit signals to an antenna, either directly or via duplexer, circulator, switch, etc. For purposes of this disclosure, circulator is intended to encompass duplexer or any other device that can reduce conducted transmit signals entering the receive chain.

As used herein, the term "receive chain" is used as commonly defined, e.g., the circuit elements through which received signals pass, although for purposes of clarity in the present disclosure it refers primarily to circuit elements following the combiner.

When applied to a range of frequencies, the term "phase shift" is defined as a constant fraction of a wave cycle, i.e. n/360 degrees. When applied to a fixed frequency, the term "phase shift" is equivalent to "phase delay" as commonly defined.

FIG. 1a is a circuit diagram of an exemplary device for providing enhanced diversity reception and/or cosite cancellation according to an embodiment of the subject matter described herein. In the embodiment illustrated in FIG. 1a, device 100 includes a transmit signal chain 120 connected to a circulator 122 which in turn is connected to a T/R antenna 124 and to a combiner 140, which is further connected to adjusting type circuitry 160.

Adjusting circuitry 160 can be used for various purposes, including, but not limited to, reducing cosite interference, performing beam forming, amplifying a conducted diversity signal (and thus obviating the need for lossy conducting coax), or phase shifting the diversity signal. Adjusting circuitry 160 provides cosite cancellation by providing an adjusted signal to combiner 140 in which cosite content is substantially equal in amplitude and anti-phase with respect to cosite content of signals from circulator 122. Adjusting circuitry 160 provides beam steering by providing an adjusted signal to combiner 140 in which inbound signal content is substantially in phase with inbound signal content of signals from circulator 122 to improve signal to noise ratio of the inbound signal by an amount depending on the degree of amplification provided by adjusting circuitry 160. Adjusting circuitry 160 provides diversity signal amplifying by providing an adjusted signal to combiner 140 that has been amplified with or without phase shifting depending on application. The flexible nature of adjusting circuitry 160 allows it to perform a variety of valuable functions as needed to enhance reception of inbound signals and/or provide cancellation of cosite. Thus, in some modes of operation, adjusting circuitry 160 may be referred to as "anti-cosite" circuitry but can provide other functions.

In one embodiment, a delay element 126 is connected between circulator 122 and combiner 140. Delay element 126 may be any type that can modify, e.g. minimize, the relative group delay between signals provided by circulator 122 and adjusting circuitry 160. In one embodiment, device 100 may be a cell phone or a portion of a cell phone. In this embodiment, FIG. 1a illustrates an exemplary anti-cosite anti-fading cell phone configuration. In one embodiment, adjusting circuitry 160 may be further connected to a secondary antenna 170. In one embodiment, combiner 140 may be further connected to a receive chain 180. In other embodiments the transmit chain 120 is connected to the antenna 124 and to the combiner 140 directly, i.e. without a circulator 122.

In one embodiment, device 100 includes a controller 190 of any type that can control at least one phone portion, e.g.

adjusting circuitry 160, in response to signals provided by one or more detectors of any type that can detect amplitude or power for at least one frequency of a detected signal.

In the embodiment illustrated in FIG. 1a, for example, device 100 may include at least one of: a first detector 262 connected between combiner 140 and receive chain 180, a second detector 264 connected between circulator 122 and combiner 140, and a third detector 266 connected between adjusting circuitry 160 and combiner 140. In one embodiment, adjusting circuitry 160 may be referred to as anti-cosite type but is intended to encompass any type that can provide alignment in combined signals of at least one content type, which alignment type is at least one of: in-phase, anti-phase and out of phase.

Combiner 140 may be any type that can combine the circulator signal and the adjusting circuitry signal to produce an inbound signal that is at least one of amplified, cosite mitigated and fading mitigated. Combiner 140 may be any type, including, but not limited to, electrical, balun, tunable, or switched, that can combine signals at desired frequencies.

In one embodiment, circuitry 160 may include at least one series connected component, including, but not limited to an attenuator 162, a phase shifter 164, or an amplifier 166 between secondary antenna 170 and combiner 140.

Attenuator 162 may be any type that can reduce power of second signal for at least one inbound signal frequency. Attenuator 162 may be any type that can reduce signal power to provide a signal to phase shifter 164 within its linear operation range, although this is not required.

Phase shifter 164 may be any type that can provide phase shift of at least one type of: fixed, variable, controllable and switchable. Phase shifter 164 may be of continuously adjustable type. Phase shifter 164 is any type that can adjust phase of a signal or of signal content, such as cosite content.

Amplifier 166 may be of any type, such as low noise, variable, tunable and fixed. Amplifier 166 may be any type than can amplitude equalize the phase shifted signal output from phase shifter 164 with respect to a circulator signal at one or more frequencies. Amplifier 166 may be any type that can adjust amplitude of a signal or of signal content, such as cosite content.

In one embodiment, circuitry 160 includes at least one delay element 168 of any type that can provide cosite cancellation at a fixed frequency. Delay type element 168 may be any type providing a fixed phase delay. Delay element 168 can be connected at any location in circuitry 160. In one embodiment, circuitry 160 may include a selector 161 that allows a plurality of switchable delay elements 168 to be switched into or out of circuit 160. Delay elements 168 may be of any type that can provide cosite cancellation and/or inbound signal enhancement at one or more fixed frequencies, such as for a channel aggregating type cell phone.

Secondary antenna 170 may be of any type that can detect a signal containing at least one content type of: inbound and transmitted. In one embodiment, circuitry 160 can comprise a phase compensator of any type that can compensate for changes in phase relationship of cosite contents of received and diversity signals, e.g. due to electromagnetic effect, e.g. delay or distortion induced by a user or nearby object.

Receive chain 180 may include at least one element, such as a filter, down converter, mixer, amplifier, digitizer, demodulator or processor. The filter may be of any type, such as low-pass, band-pass, high-pass or band-stop. The filter may be of any type such as fixed, tunable, null-invert, mixer-first, multi-stage or n-path, among others. The mixer type may be passive, although this is not required. The amplifier may be of any type, e.g. low noise or variable.

In one embodiment, device 100 may be a cell phone that can be operated at one or more fixed frequencies, where circuitry 160 provides a fixed phase delay for each fixed frequency and means of phase aligning of cosite contents of received and diversity signals at that each fixed frequency. Circuitry 160 can include one or more fixed delay elements 168, with a switch providing selection of desired delay element. In one embodiment, more than one fixed delay element can be selected simultaneously, for example to support channel aggregation type of reception. Fixed delay type circuitry 160 can comprise any amplifying type.

In one embodiment, device 100 may be a cell phone, where anti-cosite circuitry 160 may be of any type that can provide at least one of: a phase shift, a relative delay, or an amplification under control of the controller 190 as a means of at least one of: mitigating fading, amplifying diversity signals, cancelling cosite or controlling cancellation bandwidth. In one embodiment, controller 190 comprises a portion of receive chain 180 or other portion of device 100. In one embodiment, transmit signal chain 120 can comprise a filter or an amplifier of any type, such as tunable type, although this is not required.

Figure 1B:
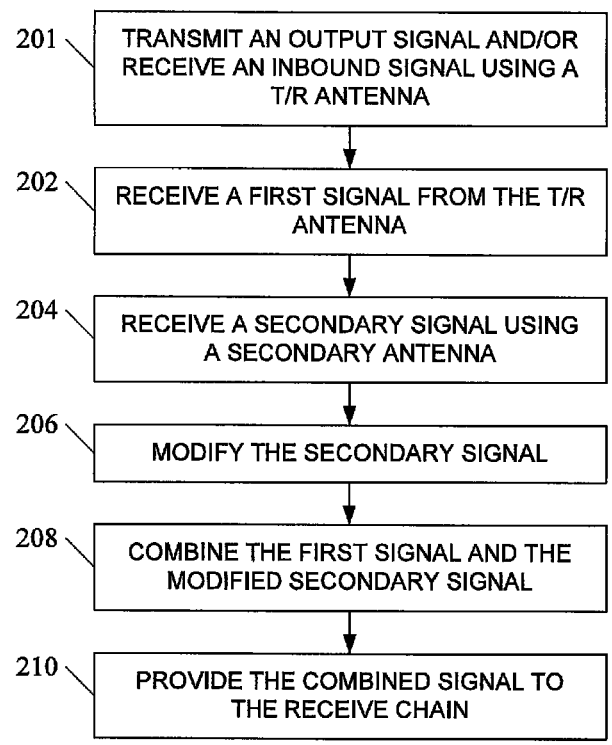
FIG. 1b is a flow chart illustrating an exemplary process for providing enhanced diversity reception and cosite cancellation according to an embodiment of the subject matter described herein.

FIG. 1b is a flow chart illustrating an exemplary process for providing enhanced diversity reception and cosite cancellation according to an embodiment of the subject matter described herein. In the embodiment illustrated in FIG. 1b, the method includes transmitting an outbound signal and/or receiving an inbound signal using a T/R antenna (block 201), and receiving a first signal from the T/R antenna (block 202). In one embodiment, the first signal may be provided by a circulator that couples a transmit chain to the T/R antenna and that couples the T/R antenna to a receive chain, which chain can include the combiner described herein or other circuit for modifying received signals. The method also includes receiving a secondary signal with a secondary antenna (block 204), modifying the secondary signal (block 206), combining the first signal and the modified secondary signal (block 208), and providing combined signal to a receive chain (block 210), which combined signal is at least one type of: amplified, cosite mitigated, and fading mitigated. In some embodiments, combined signal is further processed, e.g. down converted, conditioned, digitized and/or demodulated.

Modifying secondary signal comprises at least one of: attenuating, phase shifting, and amplifying. Attenuating is conducted to prevent, at one or more frequency of secondary signal, signal compression, saturation, inter-modulation or other distortion by phase shifter. Phase shifting comprises adjusting phase to align signal cosite content substantially anti-phase with respect to cosite content of the circulator signal at the combiner. Phase shifting can be any type such as fixed, variable, switchable or controlled. Amplifying comprises adjusting the amplitude of the phase shifted signal. In one embodiment, amplitude adjusting is conducted so that the amplified, phase shifted signal is more or less amplitude equalized at one or more frequencies with respect to the amplitude of the circulator signal or to the circulator signal cosite content.

Phase shifting is conducted by any means, such as by determining and/or applying phase shift. Phase shifting can be conducted by computing of or searching for desirable phase shift. One acceptable means for phase shift calculation is the deterministic method that described in commonly-assigned U.S. patent application Ser. No. 13/271,420, filed on Oct. 12, 2011, (now U.S. Pat. No. 8,666,347) the disclosure of which is incorporated herein by reference in its entirety. Iterative search, intended to minimize combined signal power and thereby maximize cosite cancellation, can be conducted by any means, such as steepest descent. Null steering can be conducted by any existing method such as adaptive null steering. Deterministic calculation can be conducted using detector signals.

In some embodiments of the method, anti-cosite circuitry is used to amplify and provide secondary signal to combiner. In some embodiments, anti-cosite circuitry provides phase shifting of at least one type of fixed, variable and controlled. In some embodiments, it provides phase shifting and amplifying. In some embodiments, it provides amplifying and/or phase shifting under control of controller.

Phase shifting is conducted to provide combined signals characterized by: anti-phase alignment of cosite contents, in-phase alignment of inbound signal contents and/or out-of-phase alignment of other signal contents, e.g. wirelessly propagating RF noise. Anti-phase alignment is provided as means of cancelling cosite through destructive combination of the cosite content with the anti-phase cosite content. In-phase alignment is provided as means of additively enhancing inbound signals, for example, by constructively combining the adjusted diversity signal with the received signal. Providing cancelling and/or enhancing can comprise amplifying one or more of the signals provided to the combiner. Amplifying is used to equalize amplitude of cosite contents or of inbound contents of combined signals, although equalization is not required. In one embodiment, amplifying and/or phase shifting is conducted to increase amplitude of inbound signal content of combined signal.

The method can comprise adjusting relative group delay between signals from circulator and from circuitry as means of determining cancellation bandwidth. In one embodiment, relative delay is minimized to maximize cancellation bandwidth.

In one embodiment, combining is conducted for a plurality of frequencies, such as a plurality of fixed channel frequencies used for channel-aggregated transmitting and/or receiving.

In one embodiment, the amplifying of phase shifted signals is as great as possible without adversely affecting linearity of the resulting amplified signal.

Tunable Carrier Aggregating Filters

This description relates to devices and methods of tunable carrier aggregating filters that reduce interference due to blockers, environmental interference and/or circuit noise, which filters may be implemented as integrated circuits or as component assemblies.

The present disclosure is in terms of cell phones, but is intended to encompass any device sending and/or receiving signals at any wavelength, e.g. RF, millimeter or terahertz. In this disclosure, an in-bound signal is intended to encompass any desirably received carrier and the data it transfers. A carrier signal is defined herein as a signal of finite width, e.g. 1, 5, 20 MHz (single frequency, multiple aggregated single frequencies, or spread spectrum) or other width defined by lower limit, center and upper limit frequencies, as well as carrier modulations comprising desirably transferred data defined herein as data signals. Signals at frequencies above or below a carrier are defined as out of carrier (OOC). Relative delay is defined as the difference in group delay of signals to be combined. Although described in terms of receiving, the subject matter described herein can be configured for transmitting multi-carrier signals, e.g. by connecting the below described carrier aggregating filter stage between digital-to-analog converter and power amplifier.

Figure 2:
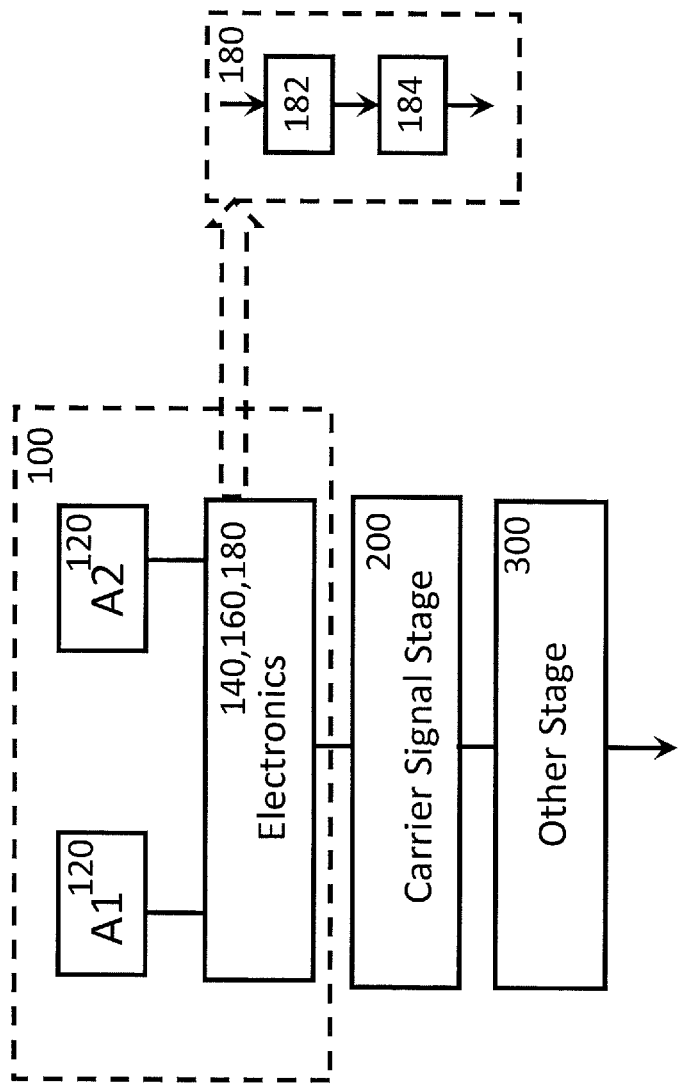
FIG. 2 is a block diagram of a cosite cancelling carrier aggregating filter according to an embodiment of the subject matter described herein.

FIG. 2 illustrates a carrier aggregating cosite-cancelling device 10 wherein previously the described cosite cancelling device 100 is referred to cosite cancelling stage 100. Cosite cancelling stage 100 may further comprise a mixer 182 connected to receive signal chain 180 and to image rejection filter 184. Mixer 182 is any type that can translate combiner output signal from a first frequency to a second frequency, such as from RF to intermediate or base band (BB). Cosite cancelling stage 100 may further comprise an image a rejection filter 184 of any type, e.g. low pass or band-pass, that can isolate a frequency translated carrier c1, c2. Cosite cancelling stage 100 may be of any type that can provide a base band signal comprising one or more carriers c1, c2 substantially free of cosite and/or mirror image content. Carrier signal (CS) stage 200 may in turn be further connected to another stage 300 of any type, such as signal conditioning or digital converting. CS stage 200 and other stage 300 may be connected to and controlled by controller 190 of cosite cancelling stage 100.

CS stage 200 is any type that can tunably isolate carrier signals c1, c2 from OOC signals. One acceptable type of CS stage 200 comprises a splitter connected to a plurality of carrier signal filters, CSFs, 240. Each CSF 240 may be of any type that can provide at least one of: OOC reduction and circuit noise reduction, for example as described in commonly assigned U.S. Provisional Patent Application Ser. No. 61/719,353 filed on Oct. 26, 2012 and U.S. Patent Application Publication No. 2013/0225099 published on Aug. 29, 2013, the disclosure of each of which is incorporated herein by reference in its entirety.

Figure 3A:
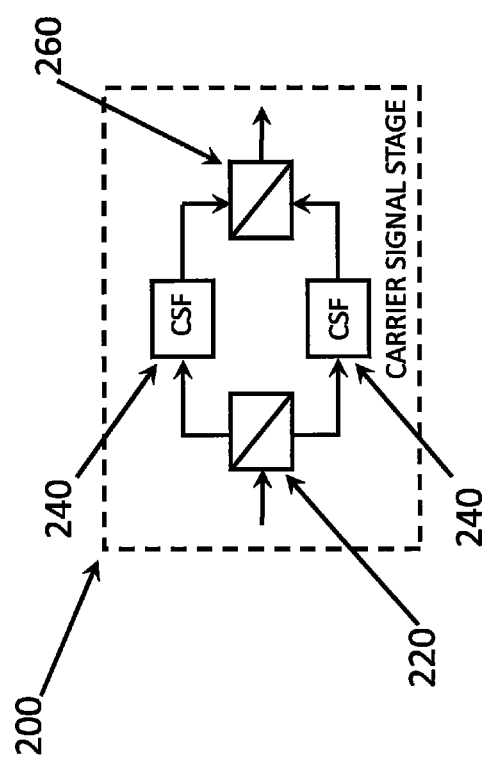
FIG. 3a is a block diagram of a carrier selection stage according to an embodiment of the subject matter described herein.

FIG. 3a illustrates a CS stage 200 which may comprise a splitter 220 connected to a plurality of CSFs 240, which are then connected to a combiner 280. CS stage 200 may comprise power detectors (not shown) of any type that can be used to equalize or to calculate phase shift according to the above-referenced application Ser. No. 13/271,420. Splitter 220 may be of any type that can split a signal. CSF 240 may be of any type that can isolate a carrier, e.g. c1 or c2 from OOC signals by OOC cancellation or rejection. Each CSF 240 may be tunable to more than one carrier, but this is not required. CSFs 240 may have overlapping, contiguous and/or non-continuous tuning ranges. CSFs 240 may provide a combined tuning range greater than, less than or equal to the operating range of carrier-aggregating cosite-cancelling device 10. Each CSF 240 may be of any type that adjusts the pass-band width of its output signals to match carrier width. Combiner 280 is any type that can combine CSF 240 signals to provide an output signal comprising distortion-free, low noise carrier signals c1, c2. Each CSF 240 may comprise any band-pass filtering type that can isolate one or more carrier c1, c2, e.g. by band-stop inversion. Each CSF 240 may comprise direct conversion type that can digitally sample a CS stage signal and perform digital band-pass filtering. Each CSF 240 may comprise one or more resonant type channel selection filters, which may be switchably connected to combiner 280.

Thus, CS stage 200 may implement a method of receiving carrier aggregated signals, i.e., signals for which carrier aggregation is implemented. The method may include forming carrier selected signals from the carrier aggregated signals. Forming the carrier selected signals may be performed by passing the carrier aggregated signals through splitter 220 and CSFs 240 resulting in carrier-specific or carrier selected signals. The method may further include combining the carrier selected signals to form an output signal comprising an enhanced carrier aggregated signal. The combining may be implemented by combiner 260.

Figure 4A:
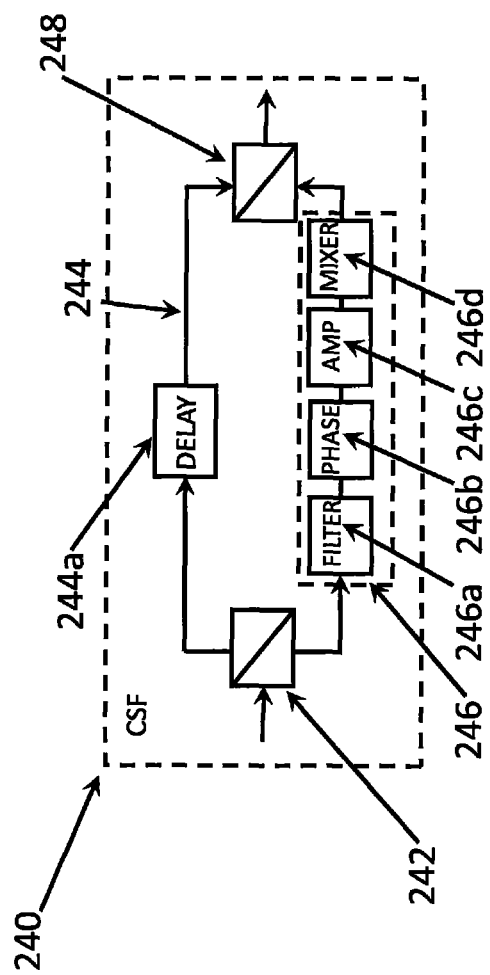
FIG. 4a is a block diagram of a carrier selection filter according to an embodiment of the subject matter described herein.

FIG. 4a illustrates one of many acceptable configurations of CSF 240 comprising a splitter 242 connected to passive line 244 and to active line 246 which lines are also connected to a combiner 248. CSF 240 may be band-stop inverting type as means of reducing interference, including blockers, distortion and circuit noise at in-carrier frequencies. Splitter 220 may be of any type that can split a signal, e.g. from cosite canceling stage 100, into two copies of equal or unequal power. One example of a splitter providing copies of unequal power is one providing, at one or more frequency, 90% of signal power to passive line 244 and 10% of signal power to active line 246. Passive line 244 may be any conductor capable of providing a finite group delay. In some cases, passive line 244 may additionally comprise a delay element 244a.

Active line 246 may comprise band-stop filter 246a, phase shifter 246b and mixer 246d. Active line 246 may further comprise an amplifier 246c of any type, such as low noise or variable, which may be connected after or before mixer 246d. Band-stop filter 246a may be constructed of active elements, e.g. op amp type, and/or passive elements. Band-stop filter 246a may be of any type that can provide a signal having a stop-band approximately one-half as wide as carrier, c1, c2, and lower limit approximately equal to 0 Hz, although other lower limits are also acceptable. Phase shifter 246b may be of any type that can provide center frequency anti-phase alignment of the passive line carrier signal and an up-translated (including a mirror image) portion. Mixer 246d may be passive or active type. In some cases, band-stop filter 246a may be any type that can without mixing provide a signal having a stop-band with the same width and center frequency as carrier. Amplifier 246c may be of any type that can equalize amplitude of active line signals to passive line signals, e.g. to support maximum OOC cancellation. One suitable amplifier type is one that can be controlled to match such signals at one or more OOC frequency, e.g. proximate upper and/or lower limit of carrier.

Figure 4B:
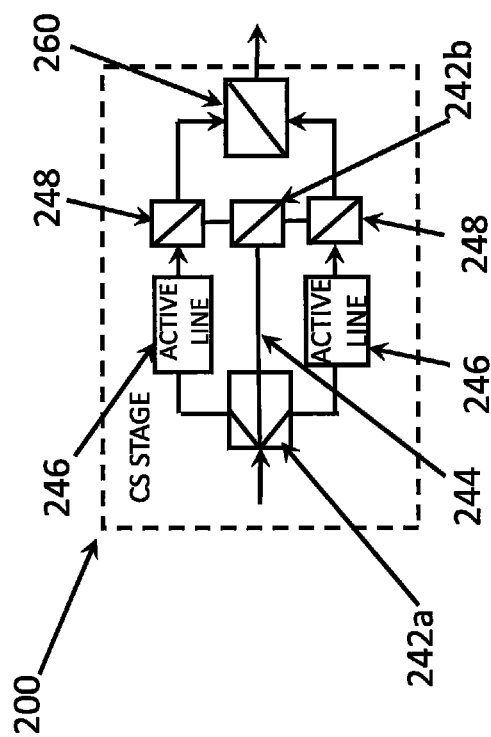
FIG. 4b is a block diagram of another carrier selection filter according to an embodiment of the subject matter described herein.

FIG. 4b illustrates a type of configuration of CS 200 comprising a plurality of CSF 240 having a common passive line 244 which configuration may have a splitter 242a of any type that can provide a plurality of output signals to a plurality of active lines 246 as well as to the common passive line 244. Passive line 244 may be connected to a passive line splitter 242b which is connected in turn a plurality of combiners 248, each of which is connected separately to a component comprised in active line 246, e.g. mixer 246d in some configurations. The combiners 248 are further connected to a combiner of any type that can provide a CS output signal.

Figure 4C:
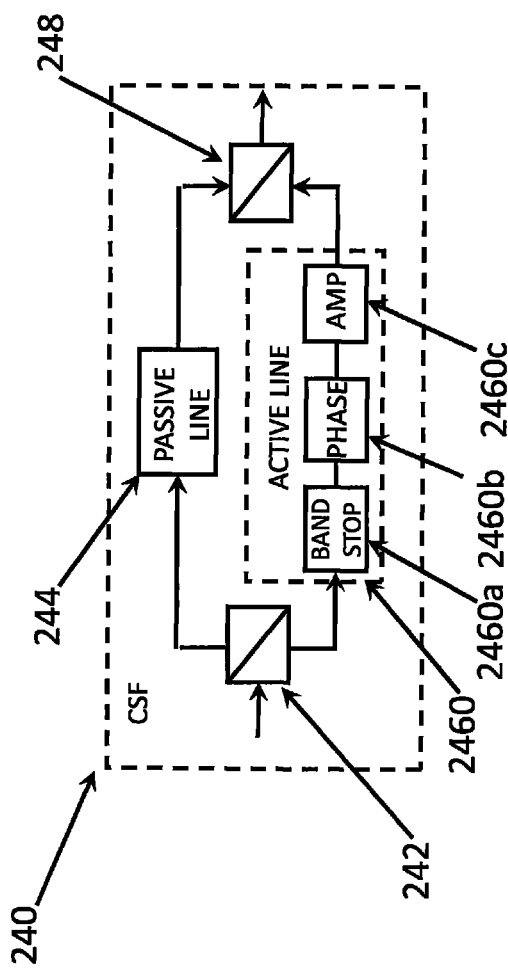
FIG. 4c is a block diagram of still another carrier selection filter according to an embodiment of the subject matter described herein.

FIG. 4c illustrates another type of active line 2460 that does not requiring frequency translating to match carrier frequency. Active line 2460 may comprise a band-stop filter 2460a, phase shifter 2460b and amplifier 2460d. Band-stop filter 2460 may be of any type that can provide a signal having a band-stop portion centered at carrier center frequency and having a width equivalent to carrier width. Phase shifter 2460b is any type that can phase align, e.g. anti-phase at center frequency, band-stop filtered signal with passive line signal. Amplifier 2460d may be of any type that can equalize the amplitude of the stop-band portion of the band-stop filtered signal to the passive line signal amplitude at one or more carrier frequencies, e.g. center frequency. Frequency shifter 2460a and amplifier 2460b may be interchanged in some embodiments. In some cases, CSF 240 may comprise a digital type, e.g. comprising a digital converter and digital band-pass filter of any type that can provide output signals comprising carrier signals.

Figure 5A:
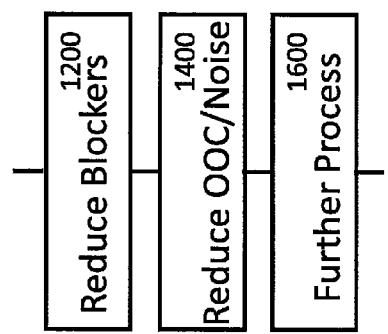
FIG. 5a is a flow chart of a method of providing isolated carriers according to an embodiment of the subject matter described herein.

FIG. 5a illustrates one method of operation for isolating 1000 carrier signals from blockers, OOC signals and/or noise. Isolating 1000 comprises steps of blocker reduction 1200, OOC and/or noise reduction 1400 and further processing 1600. Blocker reduction 1200 may be conducted by any means such as cancellation or filtering. Reduction of OOC and/or noise 1400 may be conducted by any means such as stop-band inversion filtering. Further processing may comprise frequency translating and image rejection filtering although neither is required. Further processing 1600 may further signal conditioning and/or digitizing.

Figure 5B:
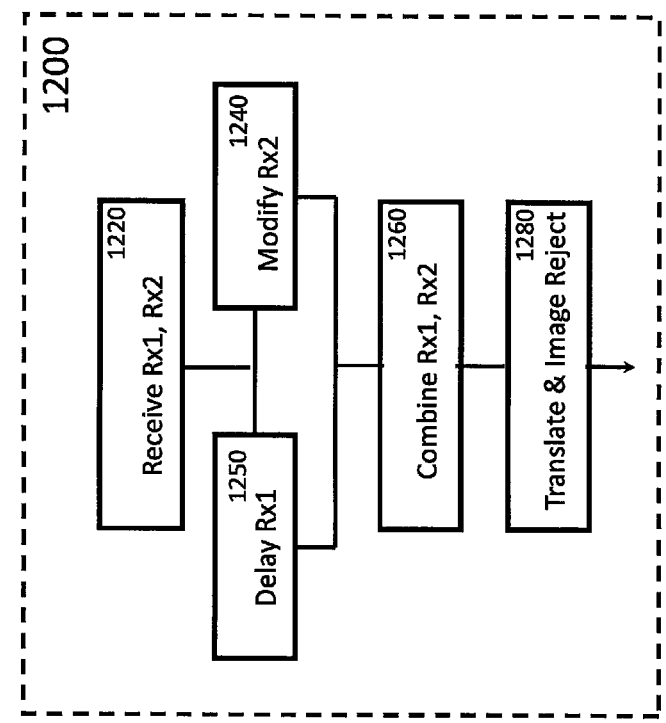
FIG. 5b is a flow chart of a method of blocker reducing according to an embodiment of the subject matter described herein.

FIG. 5b illustrates one method of blocker reduction 1200 which may comprise steps of receiving blocker (Tx1)-burdened in-bound signals Rx1, Rx2 1220, modifying Rx2 1240 while delaying Rx1 1250, followed by anti-phase combining of Rx1 and Rx2 1260. Blocker cancellation 1200 may further include frequency translation 1300, e.g. from RF to intermediate or base band (BB). Blocker cancellation 1200 may further comprise digitizing (not shown) of frequency translated and/or image filtered signal.

Figure 6:
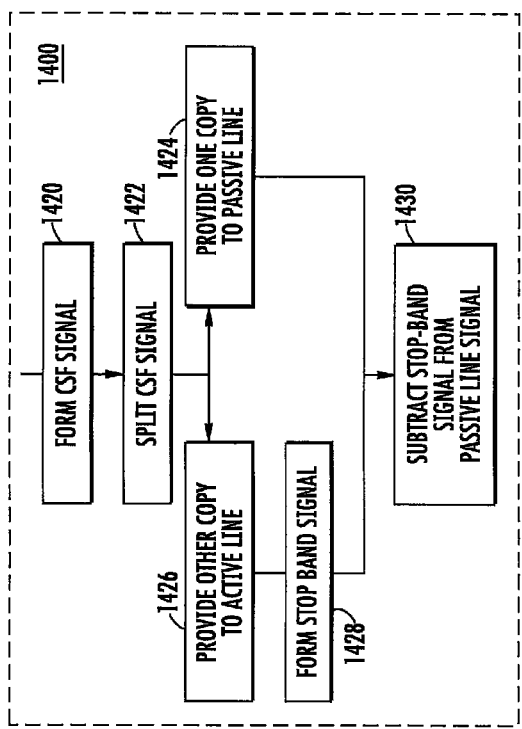
FIG. 6 is a flow chart of a method of carrier selection filtering according to an embodiment of the subject matter described herein.

FIG. 6 illustrates OOC/noise reduction 1400 comprising steps of forming a carrier selection filtered type (CSF) signal having a desirable center frequency and width 1420. CSF forming 1420 may be conducted by stop-band inversion, such as by splitting a signal into two copies 1422, providing first copy to a passive line as passive line signal 1424 and providing second copy to active line as active line signal 1426, forming in active line signal having a band-stop portion with desirable center frequency, width and phase 1428, followed by electrically subtracting stop-band signal from passive line signal 1430, e.g. by anti-phase combining, to provide a stop-band inverted type CSF output signal. Stop-band forming 1428 may comprise determining lower and upper frequency limits and filtering the active line signal to form a stop-band determined by those limits. Stop-band signal forming 1428 may comprise frequency translating to form a translated signal having a stop-band, including a mirror image of the stop band portion, centered at carrier center frequency. Stop-band forming 1428 may comprise shifting phase of first signal, before or after frequency translating, to provide anti-phase alignment of translated stop-band portion with phase of a carrier at a carrier center frequency. If carriers, e.g. c1 and c2, are contiguous and phase coherent, c1 and c2 may be considered as a single carrier for purposes of determining center frequency and width although this is not required, e.g. when c1 and c2 are of substantial different amplitude or phase.

Null inverting type bandpass filtered (BPF) signal forming may comprise equalizing amplitude of translated active line signal and passive line signal, which may be conducted before or after translating. Forming BPF signal may further comprise an inverted null type as means of providing noise reduction 1600. BPF signal forming may be conducted for a plurality of contiguous and/or non-contiguous carriers with that plurality of formed BPF signals being combined into a multi-carrier isolated output signal.

Channel or carrier selection filtering 1400 may further comprise digital filtering of digital type output signal from blocker reduction step without requiring further translating, stop-band inverting or further digitizing.

It will be understood that various details of the subject matter described herein may be changed without departing from the scope of the subject matter described herein. Furthermore, the foregoing description is for the purpose of illustration only, and not for the purpose of limitation.

What is claimed is:

1. A device for providing enhanced diversity reception and/or cosite cancellation, the device comprising:
   a first antenna for transmitting and receiving signals, including receiving a first signal having cosite content caused by the transmitting of the signals using the first antenna;
   a second antenna for receiving a diversity signal including cosite content caused by the transmitting of the signals using the first antenna;
   a controller for deterministically calculating a desired phase shift of the diversity signal to reduce the cosite content of the first signal;
   adjusting circuitry coupled to the controller for applying the deterministically calculated phase shift to the diversity signal; and
   a combiner for combining the diversity signal with the deterministically calculated phase shift with the first signal and reducing the cosite content of the first signal.

2. The device of claim 1 wherein the adjusting circuitry includes a phase shifter.

3. The device of claim 2 wherein the phase shifter includes at least one selectable fixed phase delay element.

4. The device of claim 3 comprising a selector for selecting one of the at least one selectable fixed phase delay element.

5. The device of claim 1 wherein the adjusting circuitry comprises an amplifier.

6. The device of claim 1 comprising an attenuator.

7. The device of claim 1 wherein the adjusting circuitry comprises a phase shifter connected to a signal amplifier.

8. The device of claim 1 wherein the controller is connected to at least one of: a first detector; a phase shifter; an amplifier; and an attenuator.

9. The device of claim 8 comprising at least one of: a second detector between the first antenna and a first input of the combiner; and a third detector between the adjusting circuitry and a second input of the combiner.

10. The device of claim 8 wherein the adjusting circuitry is controllable.

11. The device of claim 1, wherein the device comprises a mobile communication device.

12. The device of claim 11, wherein the mobile communication device comprises a cellular telephone.

13. A method for providing enhanced diversity reception and/or cosite cancellation, the method comprising:
   transmitting and receiving signals using a first antenna;
   receiving a first signal from the first antenna, wherein the first signal includes cosite content caused by the transmitting of the signals using the first antenna;
   receiving a diversity signal with a second antenna, wherein the diversity signal includes cosite content caused by the transmitting of the signals using the first antenna;
   adjusting the diversity signal to provide an adjusted diversity signal, wherein adjusting the diversity signal includes providing a controller that deterministically calculates a desired phase shift of the diversity signal to reduce the cosite content of the first signal and adjustment circuitry coupled to the controller for applying the deterministically calculated phase shift to the diversity signal; and
   combining the adjusted diversity signal and the first signal to provide enhanced receiving of the first signal, wherein combining the adjusted diversity signal and the first signal includes combining the diversity signal with the deterministically calculated phase shift with the first signal and reducing the cosite content of the first signal.

14. The method of claim 13 wherein adjusting the diversity signal comprises changing amplitude of the diversity signal.

15. The method of claim 14 wherein changing amplitude of the diversity signal includes equalizing an amplitude of cosite content of the diversity signal to be amplitude equalized with respect to an amplitude of cosite content of the first signal.

16. The method of claim 13 wherein applying the deterministically calculated phase shift to the diversity signal includes aligning the cosite content of the adjusted diversity signal anti-phase with respect to the cosite content of the first signal when the adjusted diversity signal and the first signal are combined.

17. The method of claim 13 comprising attenuating the diversity signal prior to applying the deterministically calculated phase shift to the diversity signal.

18. The method of claim 13 wherein the phase shift is of at least one type of: active, passive, variable, controlled and fixed.

19. The method of claim 13 wherein combining the adjusted diversity signal and the first signal includes providing the first signal to the combiner via a circulator.

20. The method of claim 13 wherein combining the adjusted diversity signal and the first signal includes at least one of: destructive combining of cosite contents of the adjusted diversity signal and the first signal; and constructive combining of the adjusted diversity signal and the first signal.

21. The method of claim 20 wherein the combining is conducted for plurality of frequencies.

22. The method of claim 13 comprising compensating a phase delay of the first signal.

* * * * *